(12) United States Patent
DeRosa et al.

(10) Patent No.: US 6,860,651 B2
(45) Date of Patent: Mar. 1, 2005

(54) METHOD AND DEVICE FOR REMOVING HEAT FROM A FIBER-OPTIC PACKAGE

(76) Inventors: Michael E. DeRosa, 27 Katie La., Painted Post, NY (US) 14870; William J. Miller, 638 Breed Hollow Rd., Horseheads, NY (US) 14845; Donald M. Trotter, Jr., 749 Millard Hill Rd., Newfield, NY (US) 14867; Ljerka Ukrainczyk, 108 Weston La., Painted Post, NY (US) 14870; Debra L. Vastag, 133 Nottingham Way, Elmira Heights, NY (US) 14903; Peter G. Wigley, 2802 Powderhouse Rd., Corning, NY (US) 14830

( * ) Notice: Subject to any disclaimer, the term of this patent is extended or adjusted under 35 U.S.C. 154(b) by 17 days.

(21) Appl. No.: 10/435,985

(22) Filed: May 12, 2003

(65) Prior Publication Data

US 2003/0215207 A1 Nov. 20, 2003

Related U.S. Application Data

(63) Continuation-in-part of application No. 10/059,762, filed on Jan. 29, 2002, now abandoned, and a continuation-in-part of application No. 09/892,077, filed on Jun. 26, 2001, now abandoned.
(60) Provisional application No. 60/309,347, filed on Aug. 1, 2001.

(51) Int. Cl.[7] .............................................. G02B 6/36
(52) U.S. Cl. ....................................................... 385/92
(58) Field of Search ........................... 385/139, 31, 88, 385/92, 94, 48, 42

(56) References Cited

U.S. PATENT DOCUMENTS

| 4,067,937 A | 1/1978 | Unno et al. ................ 264/1 |
|---|---|---|
| 4,137,060 A | 1/1979 | Timmermann ................ 65/31 |
| 4,193,663 A | 3/1980 | Timmermann ................ 385/33 |
| 4,240,849 A | 12/1980 | Kurokawa et al. ........ 156/73.2 |
| 4,270,134 A * | 5/1981 | Takeda et al. ................ 257/99 |
| 4,669,818 A | 6/1987 | Myer ........................ 385/139 |
| 4,671,609 A | 6/1987 | Khoe et al. .............. 350/96.18 |
| 4,737,006 A | 4/1988 | Warbrick ................. 350/96.18 |
| 4,755,668 A * | 7/1988 | Davis ..................... 250/227.27 |
| 4,803,689 A * | 2/1989 | Shibanuma .................. 372/36 |
| 4,824,195 A | 4/1989 | Khoe ....................... 350/96.18 |
| 4,834,493 A | 5/1989 | Cahill et al. .................. 385/77 |
| 4,925,267 A | 5/1990 | Plummer et al. .......... 350/96.2 |
| 5,179,610 A | 1/1993 | Milburn et al. ................ 385/92 |
| 5,196,005 A | 3/1993 | Doiron et al. ................. 606/7 |
| 5,263,103 A | 11/1993 | Kosinski ...................... 385/31 |
| 5,293,438 A | 3/1994 | Konno et al. ............... 385/139 |
| 5,337,377 A | 8/1994 | Yamada et al. .............. 385/15 |
| 5,353,294 A * | 10/1994 | Shigeno ...................... 372/43 |
| 5,479,543 A | 12/1995 | Black ........................ 385/139 |
| 5,500,911 A | 3/1996 | Roff .......................... 385/31 |
| 5,686,990 A * | 11/1997 | Laznicka, Jr. ............... 356/460 |
| 5,717,804 A * | 2/1998 | Pan et al. ..................... 385/94 |
| 5,793,012 A | 8/1998 | Ortiz, Jr. ................. 219/121.6 |
| 5,809,198 A | 9/1998 | Weber et al. ............... 385/139 |

(List continued on next page.)

FOREIGN PATENT DOCUMENTS

| EP | 0 260 742 | * | 7/1987 | |
|---|---|---|---|---|
| EP | 0 260 742 | | 3/1988 | ............ G02B/6/26 |
| EP | 0759569 A1 | * | 2/1996 | |
| EP | 0 759 569 | | 2/1997 | ............ G02B/6/42 |
| WO | WO 86/01150 | * | 2/1986 | |

Primary Examiner—Neil Abrams
(74) Attorney, Agent, or Firm—Timothy Schoeberle (57) ABSTRACT

A device for removing heat from a fiber-optic package having at least one optical element includes a terminated fiber for diverting excess optical power away from the optical element and an energy dissipating element having a capability to absorb the optical power from the terminated fiber and a high thermal conductivity sufficient to distribute heat generated from absorption of the optical power.

32 Claims, 7 Drawing Sheets

U.S. PATENT DOCUMENTS

| | | | |
|---|---|---|---|
| 6,065,882 A | * | 5/2000 | Roller et al. .................. 385/92 |
| 6,325,762 B1 | | 12/2001 | Tjin ........................... 600/605 |
| 6,409,391 B1 | | 6/2002 | Chang ......................... 385/53 |
| 6,522,486 B2 | * | 2/2003 | Furuhashi et al. .......... 359/819 |
| 6,524,016 B1 | * | 2/2003 | Ohki et al. .................... 385/88 |
| 6,643,447 B2 | * | 11/2003 | Guy et al. .................. 385/139 |
| 6,663,294 B2 | * | 12/2003 | Crane et al. .................. 385/92 |

* cited by examiner

METHOD AND DEVICE FOR REMOVING HEAT FROM A FIBER-OPTIC PACKAGE

CROSS-REFERENCE TO RELATED APPLICATIONS

This application is a continuation-in-part of U.S. patent application Ser. No. 09/892,077, entitled "Optical Fiber Terminator," filed Jun. 26, 2001, now abandoned.

This application claims benefit of the filing date of U.S. Provisional Application Ser. No. 60/309,347, entitled "High Optical Power Fiber Termination for Optical Components," filed Aug. 1, 2001.

This application is a continuation-in-part of U.S. patent application Ser. No. 10/059,762, entitled "Optical Power Beam Dump," filed Jan. 29, 2002, now abandoned.

BACKGROUND OF INVENTION

The invention relates generally to devices and methods for controlling heat buildup in an optical package. More specifically, the invention relates to a device and a method for removing excess optical power from a fiber-optic package.

There is an increasing demand for fiber-optic components that can withstand high optical power. This trend is being set due to increased channel count and data rates in optically amplified transmission systems as well as the advent of Raman amplification systems. Power levels that are now being sent through fiber-optic components can be anywhere from 200 to 500 mW. In Raman systems, power in the 1400+ nm wavelength range are promising to be 500 to 1000 mW or even more. Fiber-optic components exposed to such high power levels risk the possibility of sustaining high-power optical damage.

The damage from high continuous-wave optical sources in fiber is due primarily to photo-thermal mechanisms. When materials within a component absorb a fraction of the radiation, the energy most often gets efficiently converted into heat. At very high powers, even small to moderate absorption can result in a significant temperature rise. The critical factor for the component designer becomes how to manage the localized heat buildup due to photo-thermal temperature rises in the component package. The heat buildup can be caused by any material in the package that absorbs light. The heat buildup can also be caused by insertion losses intentionally designed into the component or by unintentional intrinsic material losses or scattering to other parts of the package.

Some fiber-optic components, such as variable optical attenuators, are designed to cause a controlled amount of insertion loss. Some fiber-optic components, such as optical amplifiers, are characterized by some insertion loss that causes their output signal with respect to their input signal to be attenuated. The critical issue for these devices when used in high power environments is what happens to the optical power that has been attenuated. The power has to be discarded or diverted from the component in a safe manner. Otherwise, if the optical energy is dumped somewhere in the component package, it will result in a temperature rise in the package, which can cause significant damage to temperature-sensitive elements within the package or even safety hazards, such as the package melting or catching on fire.

From the foregoing, there is desired a mechanism for removing excess optical power from a fiber-optic package so as to avoid heat buildup that can damage temperature-sensitive elements and/or create safety hazards.

SUMMARY OF INVENTION

In one aspect, the invention relates to a device for removing heat from a fiber-optic package having at least one optical element which comprises a terminated for diverting excess optical power away from the optical element and an energy dissipating element having a capability to absorb the optical power from the terminated fiber and a high thermal conductivity sufficient to distribute heat generated from absorption of the optical power.

In one embodiment, the terminated fiber has a length such that the energy dissipating element can be located at a sufficient distance from the fiber-optic package such that the heat generated at the energy dissipating element has negligible effect on a temperature distribution of the fiber-optic package.

In another embodiment, the energy dissipating element is provided by a region of the fiber-optic package.

In another aspect, the invention relates to an optical assembly which comprises a fiber-optic package having at least one optical element, a terminated fiber for diverting excess optical power away from the optical element, and an energy dissipating element having a capability to absorb the optical power from the terminated fiber and a high thermal conductivity sufficient to distribute heat generated from absorption of the optical power.

In another aspect, the invention relates to a method of removing heat from a fiber-optic package having at least one optical element which comprises diverting excess optical power away from the optical element and dumping the excess optical power on an energy dissipating element having a capability to absorb the optical power and a high thermal conductivity sufficient to distribute heat generated by absorption of the optical power.

Other features and advantages of the invention will be apparent from the following description and the appended claims.

DETAILED DESCRIPTION

Embodiments of the invention provide a device and a method for removing heat from a fiber-optic package. The term "fiber-optic package" is used herein to refer to a single fiber-optic component package or module (i.e., multiple assembled fiber-optic component packages) or cabinet (i.e., multiple modules arranged in a rack). The fiber-optic components generally have one or more functional optical elements, which may be sensitive to temperature changes. Examples of fiber-optic components include, but are not limited to, variable optical attenuators, optical couplers, and thin-film filters. The invention provides advantages for high power applications, where the optical power transmitted through the optical elements is typically greater than 500 mW and can be as high as 3 W or more, but is not limited to these applications.

In one embodiment, the invention involves moving excess optical power away from an optical element and dumping the excess optical power on an energy dissipating element. The energy dissipating element is made of a material that can absorb the wavelength of the optical power and that has sufficiently high thermal conductivity to distribute heat over a large enough mass such that local temperature rise will not become a safety hazard.

In one embodiment, a terminated fiber is used to guide excess optical power out of the fiber-optic package before dumping the optical power on the energy dissipating element. In this embodiment, the energy dissipating element is located at a remote distance from the fiber-optic package. The term "remote" is defined herein as a distance sufficiently far from the fiber-optic package that will prevent transport of heat back to the fiber-optic package and a subsequent temperature rise in the fiber-optic package that can negatively affect the optical performance of the optical element (s) in the fiber-optic package.

In another embodiment, a terminated fiber is used to focus excess optical power from an optical element in a fiber-optic package on the energy dissipating element, where the energy dissipating element is local to the optical element. For example, the energy dissipating element could be a light absorbing and thermally conducting region of the fiber-optic package.

Figure 1:
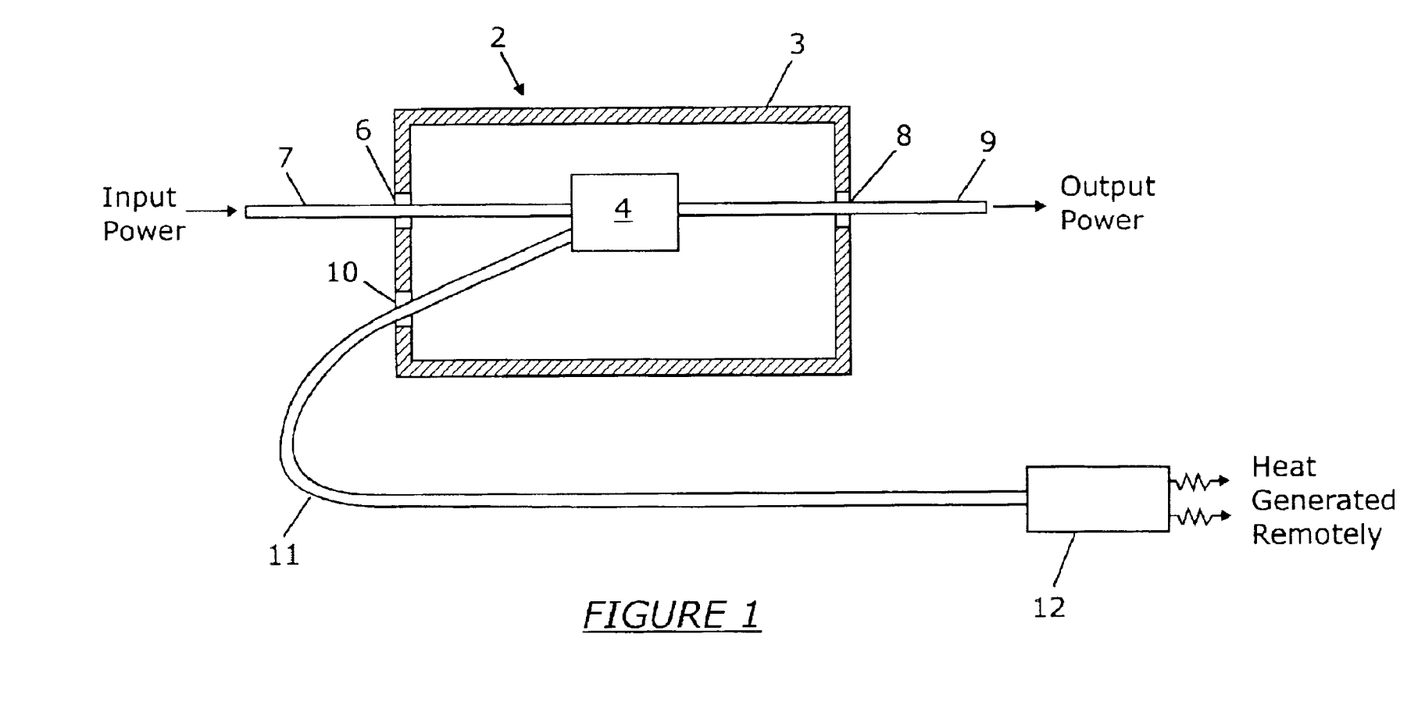
FIG. 1 shows an optical power beam dump according to an embodiment of the invention coupled to a dissipation port of an optical component.

For illustration purposes, FIG. 1 shows an environment suitable for practicing the present invention. In particular, FIG. 1 shows a fiber-optic component package 2 having an optical element 4, such as a thin-film element, enclosed within a case 3. The case 3 includes an input port 6 and an output port 8. The optical element 4 performs an operation on light transported from the input port 6 to the output port 8. Light is transported to the optical element 4 through an input fiber 7 and transported out of the optical element 4 through an output fiber 9. The case 3 further includes a dissipation port 10 through which excess optical power not transported to the output port 8 may be diverted away from the optical element 4.

In accordance with an embodiment of the invention, a device for removing heat from the component package 2 includes an optical fiber 11 and an optical power beam dump 12. In the illustrated embodiment, the optical power beam dump 12 is at a distance that is remote from the component package 2, i.e., a distance that is sufficiently far from the component package 2 such that heat generated at the optical power beam dump 12 does not influence the temperature distribution in the component package 2. In this embodiment, the optical fiber 11 forms a link between the dissipation port 10 of the component package 2 and the optical power beam dump 12. In particular, the optical fiber 11 guides excess optical power diverted from the optical element 4 to the dissipation port 10 to the optical power beam dump 12. At the optical power beam dump 12, the excess optical power is converted to heat, which is then dissipated safely, i.e., at a remote distance from the component package 2.

Figure 2A:
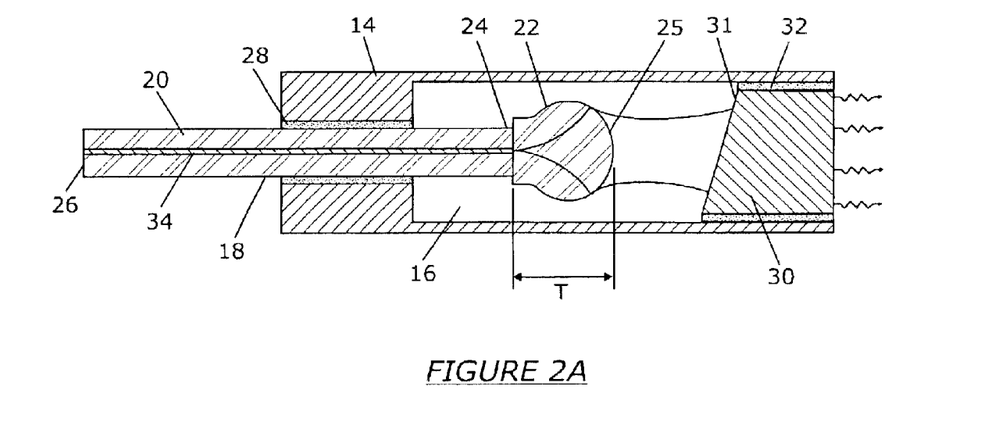
FIG. 2A is a cross-sectional view of the optical power beam dump of FIG. 1 in accordance with one embodiment of the invention.

FIG. 2A shows a detailed view of one embodiment of the optical power beam dump 12. In the illustrated embodiment, the optical power beam dump 12 includes a ferrule 14 having a cavity 16. The ferrule 14 may be made of a glass material, such as $SiO_2$, $B_2O_3$—$SiO_2$, or $GeO_2$—$SiO_2$, or other material that can withstand high temperature or has low absorption at the wavelengths to be passed through the optical power beam dump 12. A terminated fiber 18, which is a distal portion of the optical fiber 11 shown in FIG. 1, is inserted into one end of the cavity 16. Although not shown, one or both ends of the ferrule 14 may be tapered (or flared) to aid in inserting the terminated fiber 18 into the cavity 16. The terminated fiber 18 is illustrated as a lensed fiber. However, as will be described later, a variety of fiber terminations may be used in the invention. A fiber termination suitable for use in the invention has a low back-reflection, e.g., lower than −50 dB, preferably lower than −55 dB.

In one embodiment, the terminated fiber 18 includes an optical fiber 20 and a lens 22 disposed at an end 24 of the optical fiber 20. The lens 22 may be attached to the end 24 of the optical fiber 20 by processes such as fusion splicing or by an index-matched optical adhesive. The optical fiber 20 may be a single-mode fiber, a multimode fiber, or other specialized fiber. The lens 22 and the end 24 of the optical fiber 20 are disposed in the cavity 16, while the other end 26 of the optical fiber 20 extends out of the cavity 16. The end 26 of the optical fiber 20 may be coupled to a port of a fiber-optic package, such as the dissipation port 10 of the component package shown in FIG. 1. Methods for polishing the end 26 of the fiber 20 to mate with an optical fiber at a port of a fiber-optic package are well known. The lens 22 is made from a coreless fiber and has a convex surface 25. The coreless fiber may be made of a glass material, such as $SiO_2$, $B_2O_3$—$SiO_2$, or $GeO_2$—$SiO_2$.

The optical power beam dump 12 includes an energy dissipating element 30 mounted at one end of the ferrule 14 in opposing relation to the terminated fiber 18. The terminated fiber 18 and the energy dissipating element 30 may be secured to the ferrule 14 in this position with high-temperature adhesives 28, 32. In operation, the high-temperature adhesives 28, 32 may also provide strain relief for the ferrule 14 and fiber 20. To improve reliability of the optical power beam dump 12, the ferrule 14 may be collapsed at both ends to form a hermetically-sealed ferrule. Further, the cavity 16 may be drawn into vacuum. In operation, the terminated fiber 18 dumps optical power into the cavity 16, and the energy dissipating element 30 absorbs the optical power dumped into the cavity 16 and converts this optical power into heat, which is then distributed over the entire mass of the energy dissipating element 30. In this manner, the heat that would otherwise be generated within a fiber-optic package is safely dissipated by the energy dissipating element 30 at a location remote from the fiber-optic package.

The choice of material for the energy dissipating element 30 is important. In particular, the material for the energy dissipating element 30 must possess two properties: (1) it must absorb the wavelength of the optical power dumped by the terminated fiber 18 and (2) it must have a high enough thermal conductivity to distribute the heat generated from the absorbed optical power over a large enough mass such that there are no localized temperature rises, i.e., "hot spots," that can become a safety hazard. In particular, localized temperature rises or hot spots can result in the energy dissipating element material melting or catching on fire or igniting some other material in close proximity. For example, materials such as plastics and cardboards are capable of absorbing high powers, e.g., powers greater than 1 W, but do not have sufficient thermal conductivity to prevent localized temperature rise and as such would not be suitable for use in the present invention.

The material for the energy dissipating element 30 preferably has a thermal conductivity greater than 10 W/(m.° C.) at room temperature. Examples of materials suitable for the energy dissipating element 30 are metallic materials, such as steel (50 W/m.° C.), aluminum (205 W/m.° C.), copper (385 W/m.° C.), and silver (406 W/m.° C.), non-metallic materials having thermal conductivity greater than 10 W/(m.° C.), such as opaque diamond (~630 W/m.° C.), and alloys. The higher the thermal conductivity, the better the ability of the energy dissipating element 30 to spread heat over its entire mass and prevent local temperature rises (i.e., hot spots) that can result in safety hazard. The overall temperature of the energy dissipating element 30 can be reduced by using a material having a very high thermal conductivity and/or increasing the surface area of the energy dissipating element 30. Fins (not shown) can be used to increase the surface area of the energy dissipating element 30.

In addition to absorbing the optical power dumped by the terminated fiber 18, the energy dissipating element 30 also shrouds the terminated end of the terminated fiber 18, e.g., the convex surface 25 of the lens 22, so that the light exiting the terminated fiber 18 does not stray out of the cavity 16. To accomplish this, the energy dissipating element 30 is preferably spaced a distance from the terminated end of the terminated fiber 18, e.g., the convex surface 25 of the lens 22. In the illustrated embodiment, the surface 31 of the energy dissipating element 30, opposite the lens 22, is angled to avoid back-reflection. Other methods of avoiding back-reflection may also be used, such as constructing the energy dissipating element 30 from a solid black body or sandblasting, or roughening, the surface 31 of the energy dissipating element 30.

The lens 22 is a transparent, non-absorbing medium with a refractive index close to that of the core 34 of the optical fiber 20. The lens 22 acts as a focusing lens in that the beam traveling through the lens 22 is focused into a spot upon exiting the convex surface 25. The larger the radius of curvature of the convex surface 25, the larger the spot size. In order to allow the lens 22 to act as a focusing lens, the following condition should hold:

$$T/R_c > n/(n+1) + \Phi \qquad 1$$

where T is the thickness of the lens, $R_c$ is the radius of curvature of the convex surface of the lens, n is the refractive index of the lens material at the wavelength of interest, and $\Phi$ is phase shift due to diffraction of the small Gaussian beam.

In the illustrated embodiment, the optical axis of the optical fiber 20 is aligned with the optical axis of the lens 22.

Figure 2B:
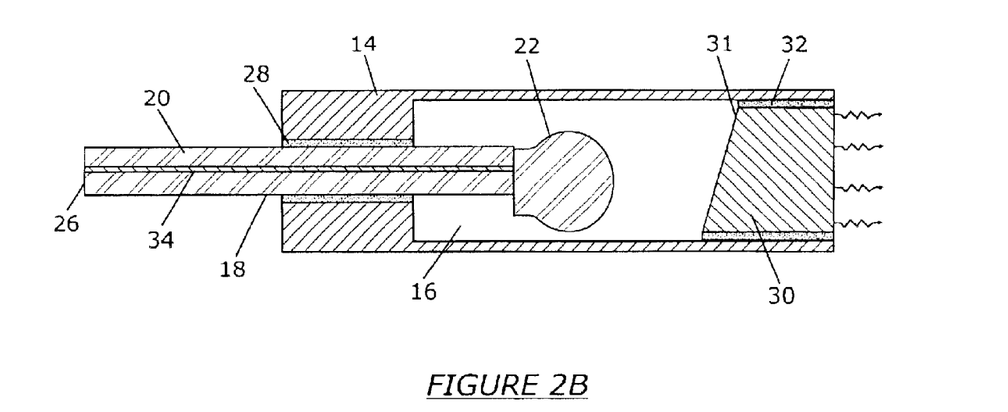
FIG. 2B is a cross-sectional view of the optical power beam dump of FIG. 2A with the optical axes of the lensed fiber and optical fiber misaligned.
Figures 3A, 3B:
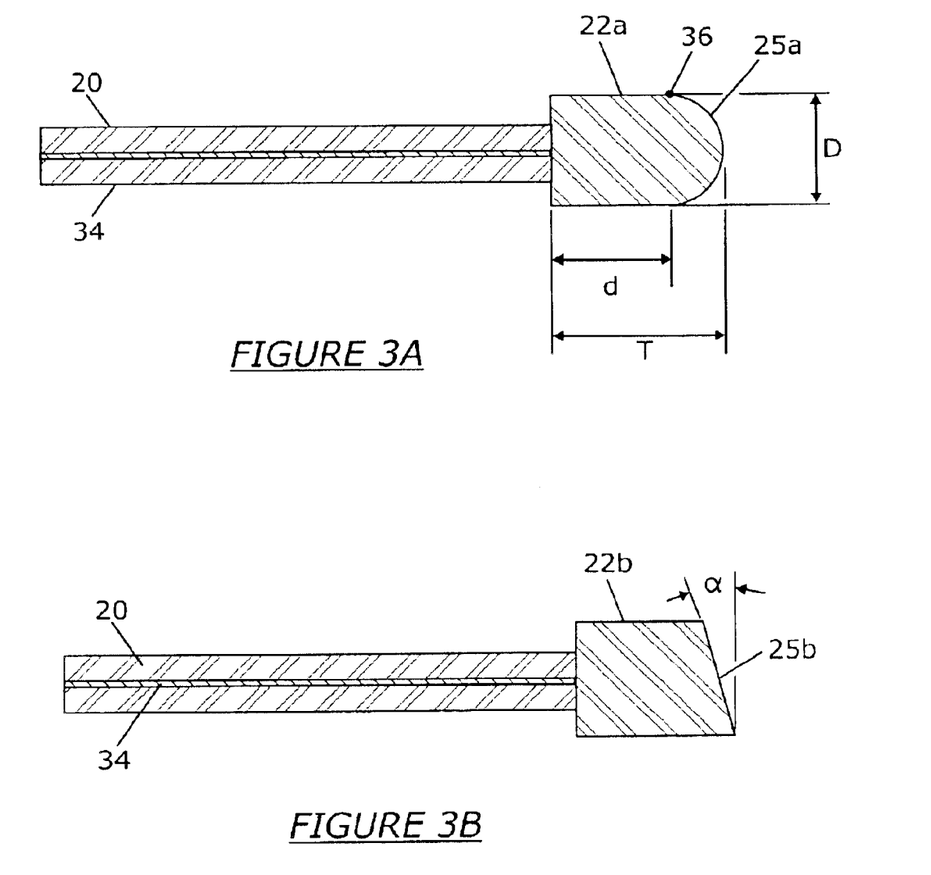
FIG. 3A is a cross-sectional view of a lensed fiber having a small radius of curvature attached to a terminated end of an optical fiber.
FIG. 3B is a cross-sectional view of a coreless fiber with a facet angle attached to a terminated end of an optical fiber.

To reduce back-reflection, a center of curvature of the lens 22 may be offset from the optical axis of the optical fiber 20, as illustrated in FIG. 2B. Returning to FIG. 2A, the diameter of the lens 22 at the point of attachment to the optical fiber 20 is larger than the diameter of the optical fiber 20. In alternate embodiments, the diameter of the lens 22 may be made the same as or smaller than the diameter of the optical fiber 20 at the point of attachment to the optical fiber 20. Also, the convex surface 25 of the lens 22 is shown as having a large radius of curvature, e.g., greater than 60 μm. In alternate embodiments, the radius of curvature of the convex surface 25 may be made smaller, e.g., in a range from 25 μm to 60 μm. In general, the radius of curvature of the convex surface 25 may range from 5 to 500 μm. FIG. 3A shows a lens 22a having a convex surface 25a with a small radius of curvature. The appropriate thickness of the lens 22a can be determined using expression (1) above.

Figure 3C:
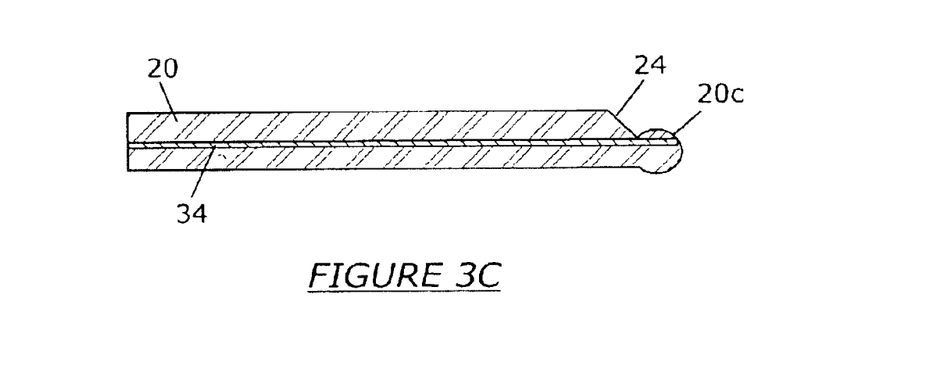
FIG. 3C is a cross-sectional view of a ball-terminated fiber.
Figure 3D:
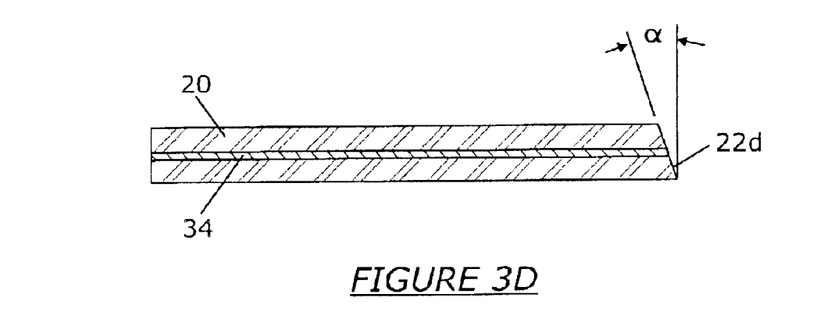
FIG. 3D is a cross-sectional view of an optical fiber having a terminated end cleaved at an angle.

Other types of fiber terminations can be used instead of a lensed fiber (i.e., a coreless fiber terminated with a radius of curvature). For example, FIG. 3B shows a fiber termination that is a coreless fiber 22b terminated with a cleaved end 25b. The cleaved end 22b forms an angle α with respect to the vertical. Typically, the angle a is equal to or greater than 8°. In FIG. 3C, the fiber termination is a ball 22c formed at the end 24 the optical fiber 20. The ball 22c may be formed by applying heat to the end 24 of the optical fiber 20 to form a termination. Preferably, the center of the ball 22c is offset from the optical axis of the optical fiber 20 to minimize back-reflection. In FIG. 3D, the fiber termination is an angled surface 22d formed at the end 24 of the optical fiber 20. The angled surface 22d is formed, for example, by cleaving the end 24 of the optical fiber 20. The angled surface 22d forms an angle α with respect to the vertical. Typically, the angle α is equal to or greater than 8°.

Figure 4A:
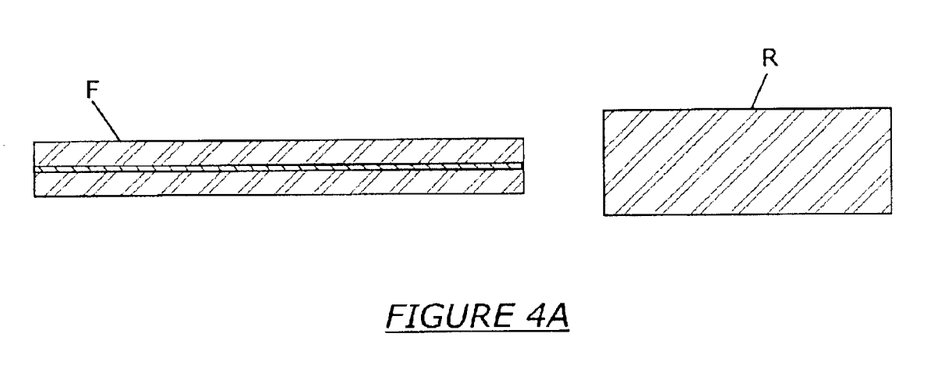
FIGS. 4A–4D illustrate a method for forming a lensed fiber.
Figure 4B:
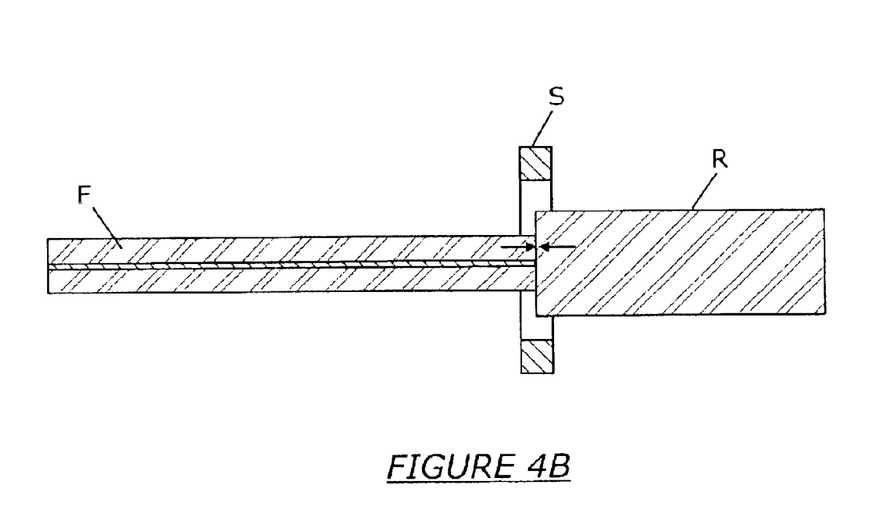
Figure 4C:
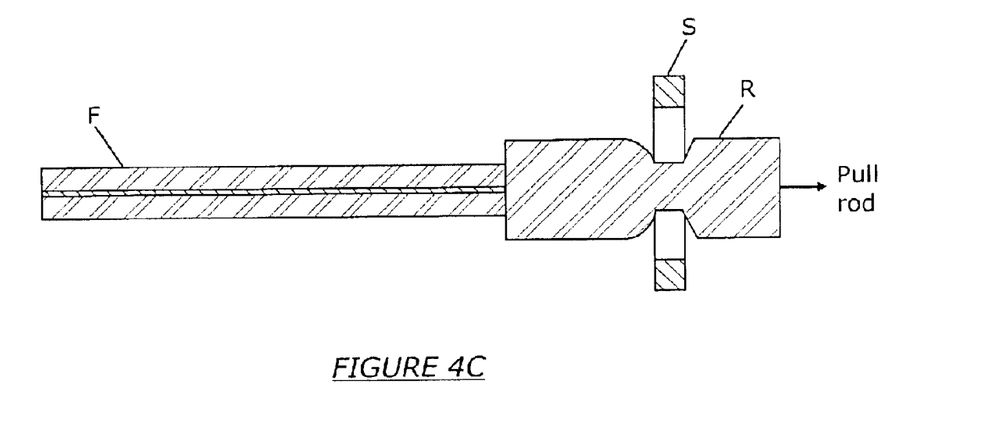
Figure 4D:
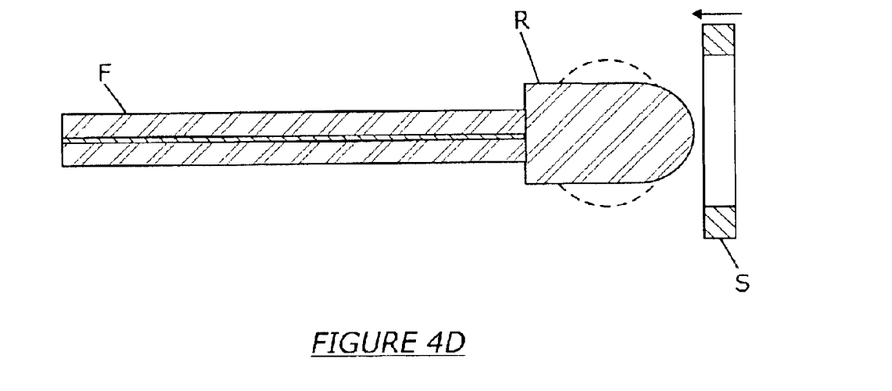

Returning to FIG. 2A, the fiber termination 22 (also the fiber terminations 22a in FIGS. 3A and 22b in FIG. 3B) can be attached to the end 24 of the optical fiber 20 by processes such as fusion splicing, laser welding, or by an index-matched epoxy (or adhesive). The lensed fiber 22 having a large radius of curvature may be fabricated in four steps: aligning, fusion splicing, taper cutting, and melting back. For the lensed fiber (22a in FIG. 3A) having a small radius of curvature, the melting-back step may be omitted. As illustrated in FIG. 4A, the aligning step involves arranging an optical fiber F in opposing relation to a coreless fiber R. As illustrated in FIG. 4B, the fusion-splicing step involves fusing the opposing ends of the fiber F and coreless fiber R by heat from a heat source S. Typically, the heat source S is a tungsten filament loop. As illustrated in FIG. 4C, the taper-cutting step involves moving the heat source S along the coreless fiber R to taper-cut the coreless fiber R. While applying the heat, the coreless fiber R is pulled in a direction away from the fiber F to accomplish the taper cut. As illustrated in FIG. 4D, the melting-back step involves moving the heat source S toward the taper-cut end of the coreless fiber R to form the desired radius of curvature (indicated by the dotted line).

Figure 5:
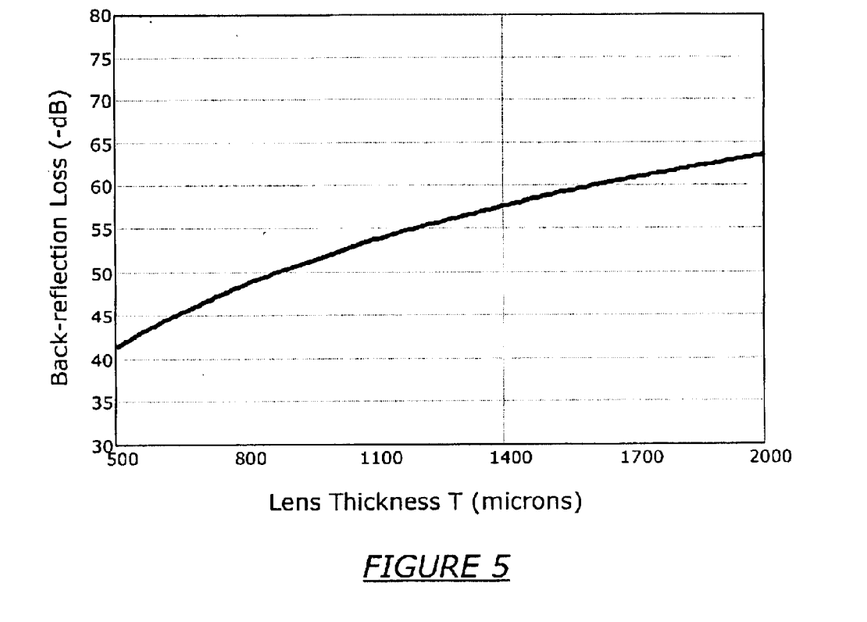
FIG. 5 is a graph of return loss versus lens thickness for a lensed fiber having a radius of curvature of 235 $\mu$m.

Returning to FIG. 2A, a beam transmitted through the fiber 20 exits the terminated end 24 and travels through the lensed fiber 22. As shown, the beam diverges as it travels through the lensed fiber 22 and is focused into a spot upon exiting the lensed fiber 22. The Fresnel reflection at the glass-air interface at the curved end 25 of the lensed fiber 22 depends on the geometry of the lensed fiber 22. FIG. 5 shows a graph of back-reflection loss as a function of the thickness of the lensed fiber. For the curve shown in FIG. 5, the Fresnel reflection at the glass-air interface at the curved end of the lensed fiber is 3.3%. According to the graph, for a lensed fiber having a radius of curvature of 235 μm and a length of approximately 1700 μm, the back-reflection loss is better than (or lower than) −55 dB. Using the standard definition of the term "db," i.e., 10×log10($P_{out}/P_{in}$), a back-reflection of −55 dB means that the amount of light reflected should be $10^{-5.5}$ as large as the power entering the lensed fiber. Preferably, the back-reflection is better than −50 dB.

Returning to FIG. 2A, the focal length of the curved surface 25 of the lensed fiber 22 is proportional to $R_c/2$, where $R_c$ is the radius of curvature of the curved surface 25. The preceding statement applies to any lensed fiber in general. Thus, the smaller the radius of curvature $R_c$ of the curved surface 25, the shorter the focal length for the back-reflected beam. The shorter the focal length for the back-reflected beam, the more the reflected beam at the curved surface 25 will diverge, and the lower will be the back-reflection.

The length of the lensed fiber 22 is limited by the diameter of the lensed fiber 22 in such a way that the beam diameter at the point where the beam exits the lensed fiber 22 does not exceed the diameter of the lensed fiber 22. The preceding statement applies for any coreless fiber attached to the optical fiber 20, regardless of whether the coreless fiber is terminated with a radius of curvature or is cleaved at an angle. If the diameter of the beam exceeds that of the coreless fiber, waveguiding in the coreless fiber and resonance effects will occur.

In FIG. 3A, for example, if the optical fiber 20 is a single-mode fiber with 10-μm mode field diameter and the coreless fiber (or lens) 22a has a thickness (T) of 2 mm and a radius of curvature of 30 μm, the diameter of the coreless fiber 22a at a point 36 where the beam exits the coreless fiber 22a would need to be at least 300 μm to avoid waveguiding in the coreless fiber 22a and resonance effects. In general, the diameter (D) of a coreless fiber at a point where the beam exits the coreless fiber can be estimated as follows:

$$D \geq 2 \cdot w_d \quad (2)$$

where $$w_d = d\theta_{beam} \quad (3)$$

and $$\theta_{beam} = \frac{\lambda}{\pi w_o n} \quad (4)$$

where $w_d$ is the mode field radius at the point where the beam exits the lens, d is the length of the lens from the fiber-lens interface to the point where the beam exists the lens, $\theta_{beam}$ is angular spread of Gaussian beam outside Raleigh range, $\lambda$ is wavelength of light, $w_o$ is mode field radius at the beam waist, and n is the refractive index at the wavelength of interest.

Figure 6:
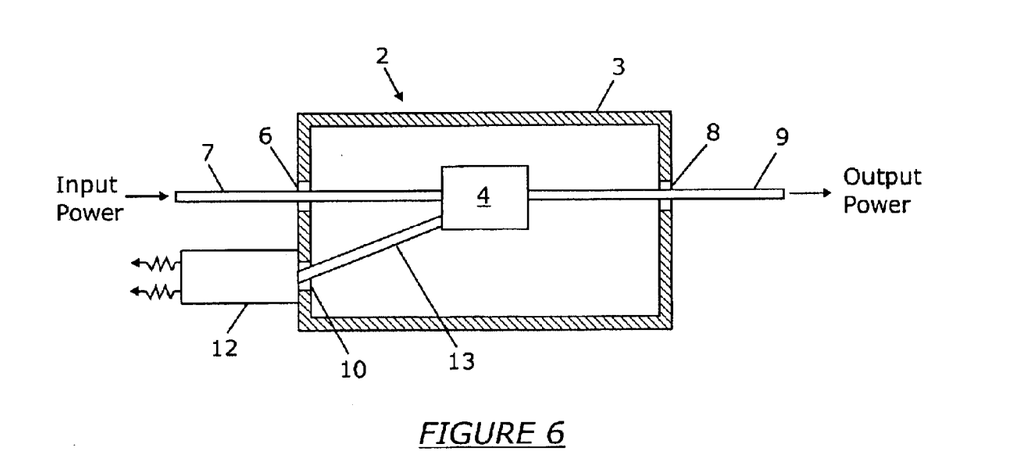
FIG. 6 shows an optical power beam dump according to an embodiment of the invention attached to an optical component.

Returning to FIG. 1, the optical power beam dump 12 is shown as located remotely from the optical component 2. In an alternate embodiment, the optical power beam dump 12 may be mounted on the case 3, which encloses the functional element 4. FIG. 6 shows a scenario where the optical power beam dump 12 is mounted on a side of the case 3. An optical fiber 13 diverts the excess optical power from the functional element 4 to the optical power beam dump 12. The optical power beam dump 12 converts the excess optical power to heat, as previously described, and dissipates the heat at a location that is remote from the functional element 4.

Figure 7:
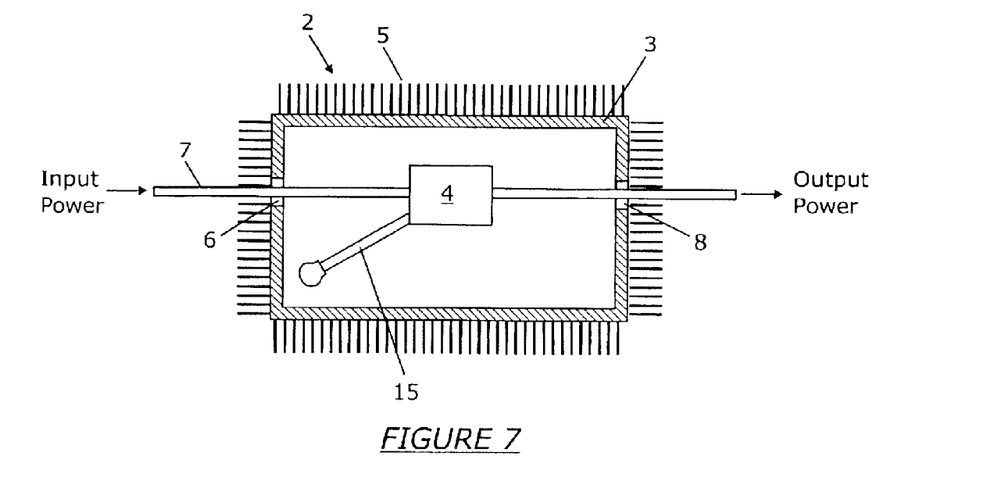
FIG. 7 shows an optical component having an integrated optical power beam dump according to an embodiment of the invention.

In another embodiment, the optical power beam dump may be integrated with the optical component 2. FIG. 7 shows a scenario where the optical power beam dump is integrated with the optical component 2. In this scenario, the case 3, which encloses the functional element 4, acts as the energy dissipating element. Fins 5 are provided on the case 3 to assist in dissipating heat from the optical component 2. A terminated fiber 15 is provided to divert excess optical power from the functional element 4 and diffuse the excess optical power away from the functional element 4. The case 3, which acts as the energy dissipating element, absorbs the light exiting the terminated fiber 15 and dissipates the heat generated from the absorbed light. The terminated fiber 15 is shown as an optical fiber having a lensed end. However, any of the other types of terminated fibers described above can also be used.

The following are examples of applications where the optical power beam dump described above can be used. The examples presented below are for illustrative purposes only and are not intended to limit the invention in anyway. In general, the optical power beam dump is useful wherever there is a need to safely dispose of optical power.

Figure 8:
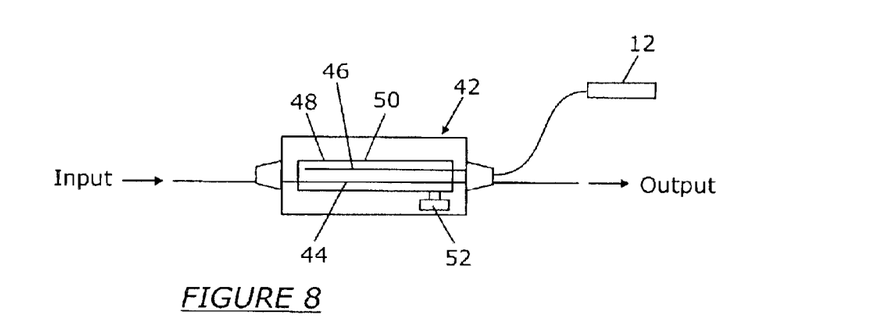
FIG. 8 shows a variable optical attenuator incorporating an embodiment of the optical power beam dump of the invention.

One application of the optical power beam dump described above is in variable optical attenuators. FIG. 8 shows a schematic of a variable optical attenuator (VOA) 42. The VOA 42 functions by controlling the amount of optical power in a transmission fiber. The VOA 42 includes two optical fibers 44, 46 inserted into a glass capillary tube 48, which is heated and drawn down so that the fiber cores are very close together. When the coupled region 50 is straight, 100% of the light entering the VOA 42 stays in the optical fiber 44. However, when mechanical stress is applied to the coupler region 50 using a small motor 52, the coupler region 50 deforms, enabling a portion of the optical power from the optical fiber 44 to couple into the optical fiber 46. The more the coupler region 50 is deformed, the more light gets coupled into the optical fiber 46, and the higher the attenuation is in the optical fiber 44. In this type of VOA 42, the optical fiber 46 is usually very short and serves only as a conduit to dispose of the power.

What happens to the power coupled into the optical fiber 46 becomes a major concern when the VOA 42 is used in high power applications. When the attenuator level is set very high, most of the power transmitted to the VOA 42 is diverted to the optical fiber 46. The end of this fiber must be shielded in some way, or else two events could happen. First, eye or skin damage could occur to anyone in the vicinity of the VOA 42 that is not aware that power is emanating out of the optical fiber 46. Second, thermal damage could occur to anything that highly absorbs the wavelength of light coming out of the fiber 46. For example, this could be packaging material in the VOA package or some material in an amplifier package. It has even been reported that fires could be started due to the very high temperatures generated by the high fiber-optic power densities. In accordance with the invention, the optical power beam dump 12 can be coupled to the optical fiber 46 to safely dissipate power from the VOA 42, and thus prevent catastrophic events.

The optical power beam dump (12 in FIG. 2A) described above can also be used in a narrow band beam dump device. Unlike the VOA 42, which diverts or attenuates all wavelengths, a narrow band beam dump device will eliminate only a narrow portion of the spectrum or maybe even only a single wavelength. For example, a wavelength division multiplexer (WDM) can be used to strip off a single wavelength or a portion of the spectrum. When a WDM is used with the optical power beam dump of the present invention, the WDM can be used to protect other components downstream in the system.

Figure 9:
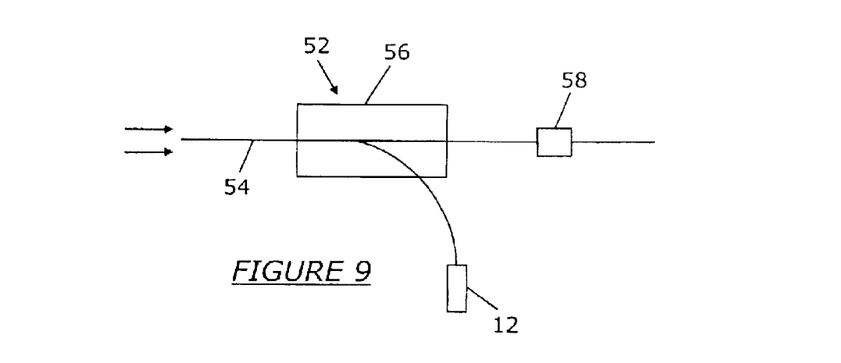
FIG. 9 shows a narrow beam dump device incorporating an embodiment of the optical power beam dump of the invention.

FIG. 9 shows a module 52 having two wavelengths $\lambda_1$, $\lambda_2$ propagating down a fiber 54, which runs through a narrow band filter 56, such as a WDM. The first wavelength ($\lambda_1$) is low power, while the second wavelength ($\lambda_2$) is high power. If the component 58 downstream of the narrow band filter 56 has a high absorption at $\lambda_2$ and can be damaged by $\lambda_2$, then it would be useful to dispose of this harmful wavelength before it gets to the sensitive component. Additionally, since the harmful wavelength is of high power, it is best if the wavelength is diverted into the optical fiber beam dump 12, which will safely dispose of the optical power. By doing this, the sensitive component 58, which could be expensive, is protected, and the system is allowed to function normally.

The invention provides one or more advantages. The device described above allows excess optical power that would otherwise produce large amounts of heat in a fiber-optic package to be diverted away from optical element(s) in the fiber-optic package and dissipated safely. The optical power could be diverted to a location remote to the fiber-optic package and dumped on an energy dissipating element at the remote location, where the energy dissipating element safely disposes of the optical power without negatively influencing the temperature distribution in the fiber-optic package. The device described above makes it possible to produce smaller fiber-optic components that can operate in high power environments because it functions to prevent heat buildup in the fiber-optic components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A device for removing heat from a fiber-optic package having at least one optical element, comprising:
    a terminated fiber for diverting excess optical power away from the optical element; and
    an energy dissipating element having a capability to absorb the optical power from the terminated fiber and a high thermal conductivity sufficient to distribute heat generated from absorption of the optical power.

2. The device of claim 1, wherein the thermal conductivity is greater than 10 W/(m.° C.) at room temperature.

3. The device of claim 1, wherein the energy dissipating element is made of a metallic material.

4. The device of claim 1, wherein the energy dissipating element is made of a non-metallic material having a thermal conductivity greater than 10 W/(m.° C.) at room temperature.

5. The device of claim 1, wherein a surface of the energy dissipating element is provided with fins to enhance heat transfer from the surface to a surrounding environment.

6. The device of claim 1, wherein the terminated end of the terminated fiber is in communication with the energy dissipating element.

7. The device of claim 6, wherein the energy dissipating element includes means for avoiding back-reflection to the terminated end.

8. The device of claim 1, wherein the terminated fiber has a length such that the energy dissipating element can be located a sufficient distance from the fiber-optic package such that the heat generated at the energy dissipating element has negligible effect on a temperature distribution of the fiber-optic package.

9. The device of claim 1, wherein the energy dissipating element is provided by a region of the fiber-optic package.

10. The device of claim 9, wherein the energy dissipating element encloses the optical element and the terminated fiber.

11. The device of claim 9, wherein the terminated fiber comprises a focusing lens formed at a distal end of an optical fiber, wherein the focusing lens focuses the optical power on the energy dissipating element.

12. The device of claim 11, wherein the focusing lens has a radius of curvature ranging from about 5 to 500 $\mu$m.

13. The device of claim 11, wherein a center of curvature of the focusing lens is offset from an optical axis of the optical fiber.

14. The device of claim 1, wherein the terminated fiber comprises a coreless fiber disposed at a distal end of an optical fiber, the coreless fiber being in communication with the energy dissipating element.

15. The device of claim 14, wherein a diameter of the coreless fiber is larger than a diameter of the optical fiber.

16. The device of claim 14, wherein a diameter of the coreless fiber at a point where a light beam exits the coreless fiber is larger than a diameter of the light beam.

17. The device of claim 14, wherein a distal end of the coreless fiber is cleaved at an angle.

18. The device of claim 1, wherein the terminated fiber comprises an optical fiber having a distal end cleaved at an angle.

19. The device of claim 1, wherein the terminated fiber comprises an optical fiber having a distal end formed into a ball.

20. The device of claim 19, wherein a center of the ball is offset from an optical axis of the optical fiber.

21. The device of claim 1, wherein the energy dissipating element is spaced a distance from a terminated end of the terminated fiber.

22. The device of claim 1, wherein the terminated fiber has a back-reflection lower than −50 dB.

23. The device of claim 1, wherein a terminated end of the terminated fiber is disposed in a cavity in a ferrule made of a material having low absorption at a wavelength of the optical power.

24. The device of claim 23, wherein the energy dissipating element is coupled to the ferrule and is in communication with the terminated end of the terminated fiber.

25. An optical assembly, comprising:
    a fiber-optic package having at least one optical element;
    a terminated fiber for diverting excess optical power away from the optical element; and
    an energy dissipating element having a capability to absorb the optical power from the terminated fiber and a high thermal conductivity sufficient to distribute heat generated from absorption of the optical power.

26. The optical assembly of claim 25, wherein the thermal conductivity is greater than 10 W/(m.° C.) at room temperature.

27. The optical assembly of claim 25, wherein the energy dissipating element is located at a sufficient distance from the fiber-optic package such that heat generated at the energy dissipating element has negligible effect on a temperature distribution of the fiber-optic package.

28. The optical assembly of claim 25, wherein the energy dissipating element is provided by a region of the fiber-optic package.

29. The optical assembly of claim 28, wherein the terminated fiber includes means for focusing the excess optical power on the region of the fiber-optic package.

30. The optical assembly of claim 29, wherein the energy dissipating element encloses the terminated fiber and the optical element.

31. A method of removing heat from a fiber-optic package having at least one optical element, comprising:

diverting excess optical power away from the optical element; and dumping the excess optical power on an energy dissipating element having a capability to absorb the optical power and a high thermal conductivity sufficient to distribute heat generated by absorption of the optical power.

32. The method of claim 31, wherein the energy dissipating element is located at a sufficient distance from the fiber-optic package such that the heat generated at the energy dissipating element has a negligible effect on a temperature distribution of the fiber-optic package.

* * * * *